(12) United States Patent
Fukatsu et al.

(10) Patent No.: US 10,377,197 B2
(45) Date of Patent: Aug. 13, 2019

(54) TOWING VEHICLE

(71) Applicant: KABUSHIKI KAISHA TOYOTA JIDOSHOKKI, Aichi-ken (JP)

(72) Inventors: Fumihiro Fukatsu, Aichi-ken (JP); Tsuyoshi Ehama, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 11 days.

(21) Appl. No.: 15/490,211

(22) Filed: Apr. 18, 2017

(65) Prior Publication Data
US 2017/0313142 A1 Nov. 2, 2017

(30) Foreign Application Priority Data

Apr. 28, 2016 (JP) ................. 2016-091338

(51) Int. Cl.
| | | |
|---|---|---|
| *B60D 1/36* | (2006.01) | |
| *A01B 63/118* | (2006.01) | |
| *B60D 1/62* | (2006.01) | |
| *B62D 49/00* | (2006.01) | |
| *A01B 63/16* | (2006.01) | |
| *A01B 59/042* | (2006.01) | |

(52) U.S. Cl.
CPC .............. *B60D 1/36* (2013.01); *A01B 63/118* (2013.01); *A01B 63/163* (2013.01); *B60D 1/62* (2013.01); *B62D 49/00* (2013.01); *A01B 59/042* (2013.01)

(58) Field of Classification Search
CPC ........... B60D 1/36; B60D 1/62; A01B 63/118; A01B 63/163; A01B 59/042; B62D 49/00

(Continued)

(56) References Cited

U.S. PATENT DOCUMENTS 3,981,474 A * 9/1976 Szilagyi ................ B60R 1/0605
248/487
4,027,112 A * 5/1977 Heppner .................. A47C 7/38
381/182

(Continued)

FOREIGN PATENT DOCUMENTS

| CN | 103434407 | 12/2013 |
| EP | 2 433 482 | 3/2012 |

(Continued)

OTHER PUBLICATIONS

Office Action issued in Taiwan Counterpart Patent Appl. No. 106113699, dated Mar. 23, 2018.

(Continued)

*Primary Examiner* — Jacob D Knutson
(74) *Attorney, Agent, or Firm* — Greenblum & Bernstein, P.L.C.

(57) ABSTRACT

A towing vehicle includes a vehicle body, a coupling device provided in a rear portion of the vehicle body, and an inching control switch located at a position in the rear portion of the vehicle body shifted from a center of the rear portion of the vehicle body in a vehicle width direction. The vehicle body has a mount surface provided adjacent to a rear corner thereof. The mount surface is exposed to the outside and the inching control switch projects from the mount surface to the outside of the vehicle. The mount surface extends at an angle with respect to the vehicle width direction. A part of the mount surface that is closest to the center of the rear portion in the vehicle width direction is located rearward of the other part of the mount surface that is most distant from the center of the rear portion.

4 Claims, 3 Drawing Sheets

(58) Field of Classification Search
USPC .......................................................... 280/477
See application file for complete search history.

(56) References Cited

U.S. PATENT DOCUMENTS

| 7,547,036 B2 * | 6/2009 | Mochizuki | B60D 1/02 |
| | | | 280/507 |
| 2012/0073894 A1 | 3/2012 | Sprinkle et al. | |

FOREIGN PATENT DOCUMENTS

| EP | 2433482 | | 3/2012 |
| JP | 60-42003 | | 3/1985 |
| JP | 63-35707 | | 3/1988 |
| JP | 5-199618 | | 8/1993 |
| JP | 5-207613 | | 8/1993 |
| JP | 6-234374 | | 8/1994 |
| JP | 2002321653 A | * | 11/2002 |
| JP | 2010-202367 | | 9/2010 |
| JP | 2010202367 A | * | 9/2010 |

OTHER PUBLICATIONS

Search Report issued in European Patent Office (EPO) Patent Application No. 17167925.1, dated Oct. 4, 2017.
Office Action issued in Japan Counterpart Patent Appl. No. 2016-091338, dated Jun. 5, 2018.

* cited by examiner

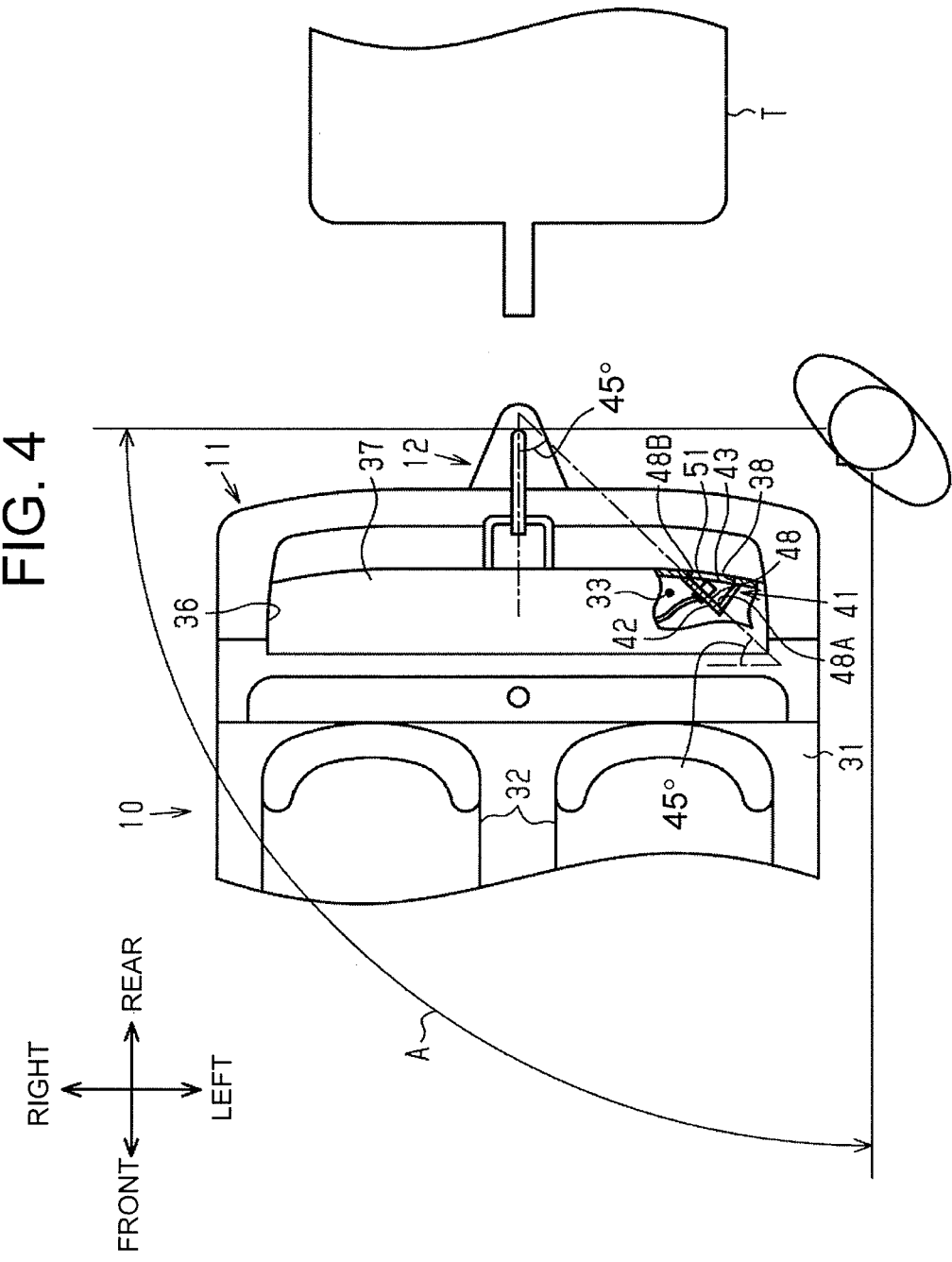

TOWING VEHICLE

BACKGROUND OF THE INVENTION

The present invention relates to a towing vehicle.

A towing vehicle for pulling a cart or the like has in the rear of the vehicle body thereof a coupling device through which an object to be towed is connected to the towing vehicle. Connection of the towing object to the coupling device of the towing vehicle is performed while moving the towing vehicle backward.

Japanese Unexamined Patent Application Publication No. 05-199618 discloses a towing vehicle which is equipped with forward and backward inching switches that are operable from outside of the vehicle. The towing vehicle may be inched or moved slowly or by small degrees in forward or backward direction by operating the appropriate inching switch. The inching switches are provided in the rear of the vehicle body or at a position on one of the lateral sides of the vehicle body and adjacent to the rear corner of on the lateral side. When the inching switches are provided in the rear of a vehicle body, the operator of the towing vehicle operates the inching switches from behind the vehicle body, and when the inching switches are provided in one of the lateral sides of the vehicle body, the operator of the towing vehicle operates the inching switches on the lateral side of the vehicle body. The operator of a towing vehicle can move the towing vehicle in an inching manner by manipulating the inching switches.

An operator of the towing vehicle operating the inching switches on a lateral side of the vehicle body has difficulties in visually checking the coupling condition between the coupling device and the towing object. The operator manipulating the inching switches provided in the rear of the vehicle body needs to be present between the vehicle body and the towing object or a cart carrying a load. In this case, the coupling condition between the coupling device and the towing object is more visible as compared with the case in which the inching switches are provided on a lateral side of the vehicle body. However, some part of the field of view of the operator may be occupied or blocked by the vehicle body and the towing object and the field of view is reduced.

The present invention is directed to providing a towing vehicle which provides a good field of view that helps the operator of the towing vehicle to visually check the coupling condition between a coupling device of the towing vehicle and a towing object by ensuring a wider field of view of the operator.

SUMMARY OF THE INVENTION

In accordance with an aspect of the present invention, there is provided a towing vehicle that includes a vehicle body, a coupling device which is provided in a rear portion of the vehicle body and to which an object to be towed is connectable, and an inching control switch located at a position in the rear portion of the vehicle body that is shifted from a center of the rear portion of the vehicle body in a vehicle width direction. The vehicle body has a mount surface at a position adjacent to a rear corner thereof. The mount surface is provided such that the mount surface is exposed to the outside of the vehicle body and the inching control switch projects from the mount surface to the outside of the vehicle body and that the mount surface extends at an angle with respect to the vehicle width direction so that a part of the mount surface that is closest to the center of the rear portion of the vehicle body in the vehicle width direction is located rearward of the other part of the mount surface that is most distant from the center of the rear portion of the vehicle body in the vehicle width direction.

Other aspects and advantages of the invention will become apparent from the following description, taken in conjunction with the accompanying drawings, illustrating by way of example the principles of the invention.

BRIEF DESCRIPTION OF THE DRAWINGS

FIG. 4 is a fragmentary plan view showing positional relationship between an operator of the towing tractor and an inching control switch.

DETAILED DESCRIPTION OF THE EMBODIMENTS

Figure 1:
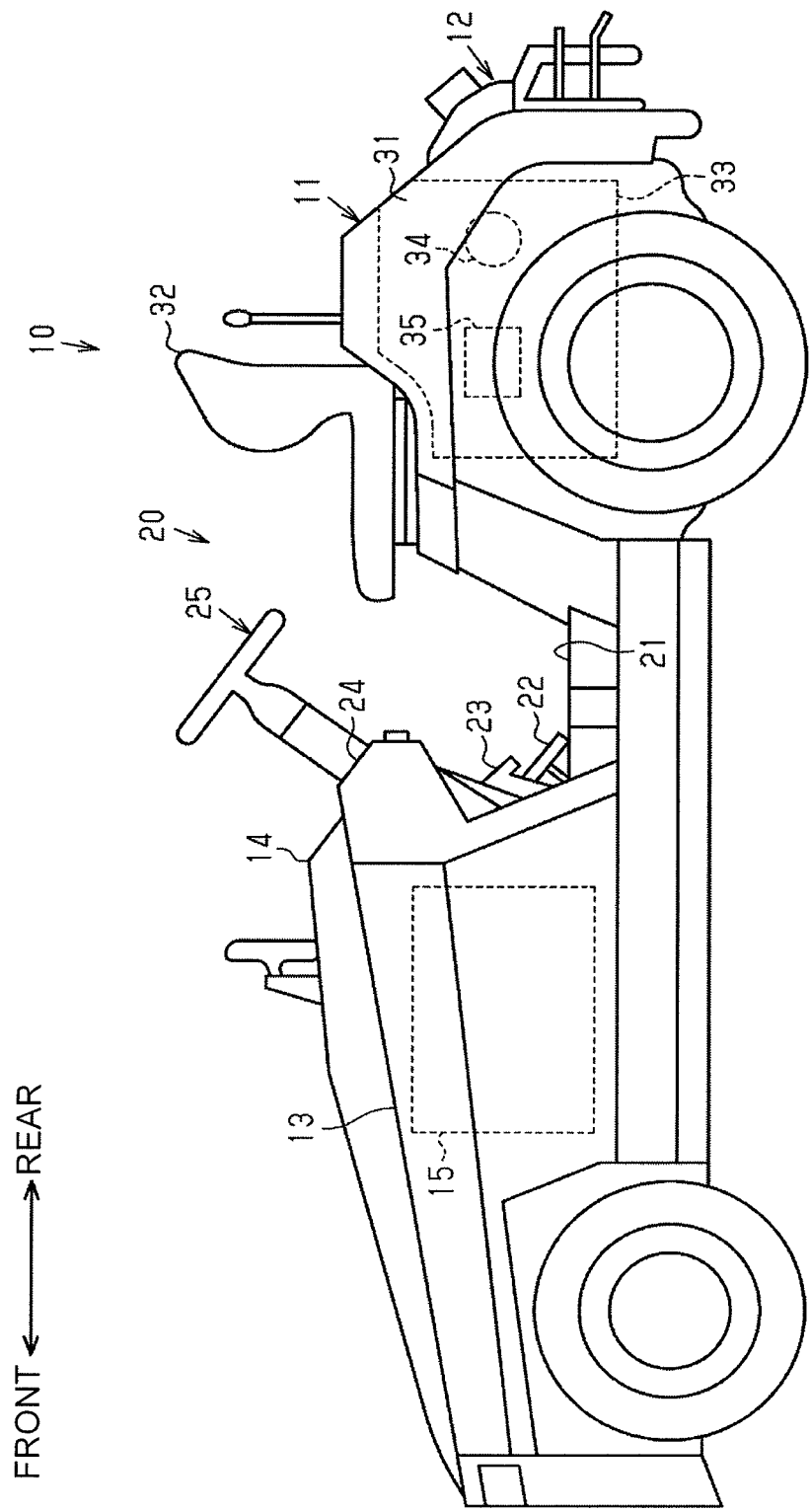
FIG. 1 is a schematic side view of a towing tractor according to an embodiment of the present invention.

The following will describe a towing tractor according to an embodiment of the present invention with reference to the accompanying drawings. Referring to FIG. 1, there is shown a towing tractor 10 as the towing vehicle of the present invention. The towing tractor 10 includes a vehicle body 11. The towing tractor 10 further includes a coupling device 12, or a drawbar, which is provided in the rear portion of the vehicle body 11 and to which an object to be towed is connectable. The towing tractor 10 pulls the towing object connected to the coupling device 12. Examples of the towing object include a cart carrying a load. It is to be noted that the terms of front, rear, right, and left used in the following description correspond to the front, rear, right, and left, respectively, of the vehicle body 11 of the towing tractor 10.

The vehicle body 11 of the towing tractor 10 includes an operator's compartment 20 and a battery housing 13 located forward of the operator's compartment 20. The battery housing 13 is covered by an openable battery hood 14. A battery 15 is accommodated in the battery housing 13.

Figure 2:
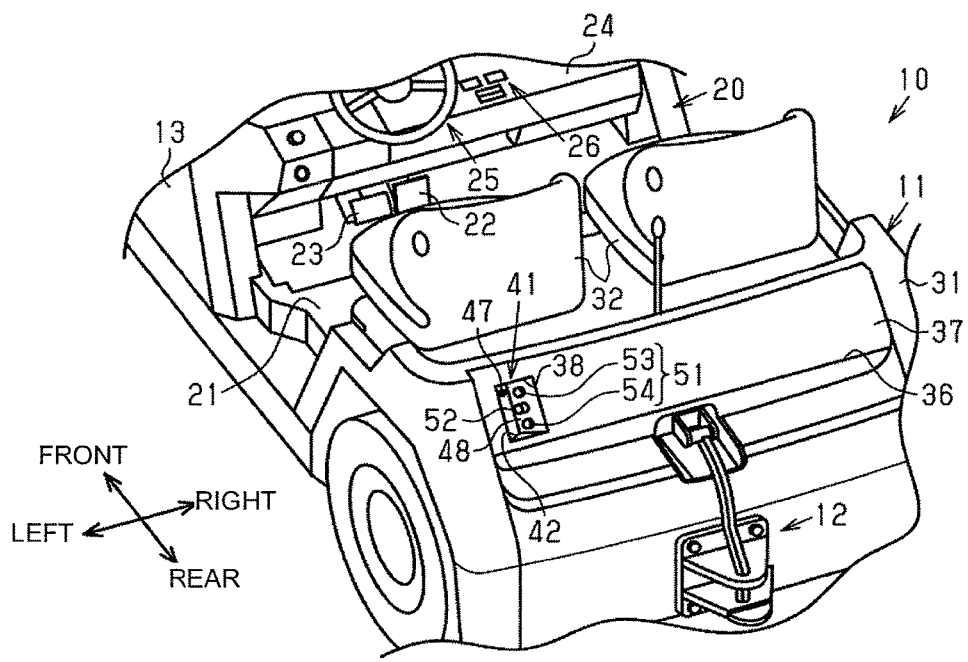
FIG. 2 is a fragmentary perspective view of the towing tractor of FIG. 1.

The vehicle body 11 includes a rear frame 31 located rearward of the operator's compartment 20. The rear frame 31 serves also as the counterweight of the towing tractor 10. The rear frame 31 according to the present embodiment may be formed by casting. Referring to FIG. 2, two seats 32 are disposed on the upper surface of the rear frame 31.

As shown in FIGS. 1 and 2, the operator's compartment 20 includes a floor 21. The floor 21 is disposed between the battery housing 13 and the rear frame 31. An accelerator pedal 22 and a brake pedal 23 are provided in the operator's compartment 20. A dashboard 24 is mounted on the rear surface of the battery housing 13.

Referring to FIG. 2, a steering wheel 25 and instruments 26 for indicating various conditions of the towing tractor 10 are disposed on the dashboard 24.

As shown in FIG. 1, the rear frame 31 has therein a storage space 33 in which a driving motor 34 for driving the towing tractor 10 and a control device 35 for controlling the driving motor 34 are disposed. The driving motor 34 is driven by the battery 15. The towing tractor 10 according to the present embodiment thus having the battery 15 is of a battery-powered type.

As shown in FIG. 2, the rear frame 31 has a storage opening 36 that is opened to the storage space 33 so as to provide an access thereto. The storage opening 36 is provided rearward of the rear frame 31 (or the vehicle body 11). The vehicle body 11 has in the rear portion thereof a panel 37 for closing the storage opening 36.

The panel 37 has therethrough a rectangular opening 38. The opening 38 is provided at a position in the panel 37 that is shifted from the center of panel 37 in the vehicle width direction (or the lateral direction of the vehicle body 11). According to the present embodiment, the opening 38 is located on the left side from the center of the panel 37 in the vehicle width direction.

The vehicle body 11 has in the rear portion thereof an inching control switch device 41. According to the present embodiment, the inching control switch device 41 is mounted to the panel 37. The inching control switch device 41 includes an inching control switch 51, a stop switch 52, and a switch casing 42. More specifically, the inching control switch 51 includes a forward inching control switch 53 and a backward inching control switch 54.

Figure 3A:
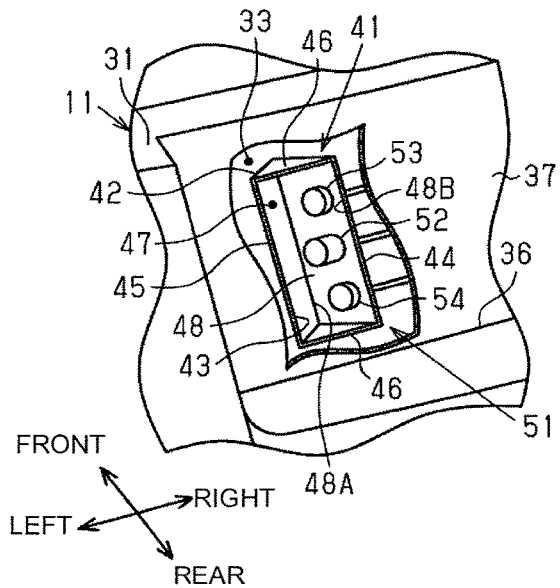
FIG. 3A is an enlarged fragmentary view showing a part of an inching control switch device of the towing tractor of FIG. 1.
Figure 3B:
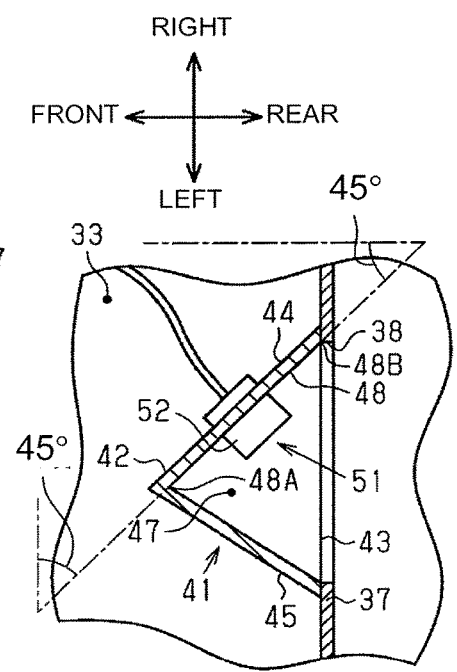
FIG. 3B is a cross-sectional view of the inching control switch device of FIG. 3A.

As shown in FIGS. 3A and 3B, the switch casing 42 is formed so as to provide a space 47 of a triangular prism shape, one side of which is opened at 43 to provide an opening. The switch casing 42 includes a mount plate 44 of a rectangular shape, a first fixing plate 45 of a rectangular shape connected at one longer side thereof to the mount plate 44, and a pair of triangular second fixing plates 46 connected to the mount plate 44 and the first fixing plate 45 at their respective opposite shorter sides. The mount plate 44 and the first fixing plate 45 form two sides of the switch casing 42 of the triangular prism shape. The triangular second fixing plates 46 fixedly connected at the opposite shorter sides of the mount plate 44 and the first fixing plate 45 form the bases of the triangular prism shape closing the openings at the opposite ends of the triangular prism shape. With this configuration, the space 47 is defined in the switch casing 42 by the mount plate 44, the first fixing plate 45, and the two second fixing plates 46. The space 47 is opened to the outside through the opening 43. The area of the opening 43 is substantially the same as the area of the opening 38 of the panel 37.

The switch casing 42 is mounted so that the opening 43 faces rearward. The mount plate 44, the first fixing plate 45, and the second fixing plates 46 are disposed extending inward or toward the storage space 33 of the rear frame 31. Specifically, the switch casing 42 is provided in the rear part of the rear frame 31 (or the vehicle body 11) so as to be recessed frontward. The switch casing 42 corresponds to the recessed portion of the present invention. With the switch casing 42 mounted to the panel 37, the opening 43 and the opening 38 coincide and communicate with each other. The mount plate 44 has a mount surface 48 that faces the space 47 and is also exposed to the outside of the vehicle body 11 through the opening 38.

Since the opening 38 of the panel 37 is located on the left side from the center of the panel 37 in the vehicle width direction, the mount plate 44 of the switch casing 42 is accordingly located on the left side from the center of panel 37 in the vehicle width direction. In the switch casing 42, the mount plate 44 is located closer to the center of the panel 37 in the vehicle width direction than the first fixing plate 45 is. The mount plate 44 is disposed in such an orientation that an imaginary plane extending along the mount surface 48 of the mount plate 44 in the direction crossing the first fixing plate 45 intersects with an imaginary plane extending along the vehicle width direction. That is, the mount surface 48 is formed to extend at an angle with respect to the vehicle width direction. The mount surface 48 of a rectangular shape has a pair of opposite sides 48A and 48B. The side 48A is a boundary between the mount plate 44 and the first fixing plate 45 and also the most distant part of the mount surface 48 from the center of the panel 37 in the vehicle width direction; and the side 48B is the closest part of the mount surface 48 to the center of the panel 37 in the vehicle width direction. The side 48B is located rearward of the side 48A.

Assuming that the mount surface 48 has a rotational axis extending in the vertical direction, the mount surface 48 may be described as rotated about the rotational axis and inclined with respect to the vehicle width direction and the vehicle longitudinal direction. In other words, the imaginary plane extending along the mount surface 48 intersects with both the imaginary plane extending in the vehicle width direction and an imaginary plane extending in the vehicle longitudinal direction.

It is preferable that the mount surface 48 of the mount plate 44 be inclined at an angle of between 40 degrees and 50 degrees with respect to the vehicle width direction. In other words, it is preferable that the imaginary plane extending along the mount surface 48 be inclined at an angle of between 40 degrees and 50 degrees with respect to the vehicle width direction. According to the present embodiment, the mount surface 48 is inclined at 45 degrees with respect to the vehicle width direction, as shown in FIG. 4. The mount surface 48 is also inclined at 45 degrees with respect to the vehicle longitudinal direction. Thus the inclined mount surface 48 is oriented to face obliquely rearward and leftward. According to the present embodiment, the mount surface 48 and the left rear corner of the vehicle body 11 are diagonally opposed each other.

The forward and backward inching control switches 53 and 54 and the stop switch 52 are disposed in the space 47 of the switch casing 42. The inching control switch 51 (the forward inching control switch 53 and the backward inching control switch 54) and the stop switch 52 of the present embodiment are latching button switches that turn on and off alternately by being pressed. The inching control switch 51 and the stop switch 52 are mounted to the mount plate 44, projecting at a right angle from the mount surface 48 of the mount plate 44. In other words, the inching control switch 51 and the stop switch 52 project vertically from the mount surface 48 at 45 degrees with respect to the vehicle width direction accordingly as viewed in the plan view of FIG. 4. Since the mount plate 44 is disposed on the left side from the center of the panel 37 in the vehicle width direction, the inching control switch 51 and the stop switch 52 are accordingly located on the left side from the center of the panel 37 in the vehicle width direction.

Since the mount surface 48 is exposed to the outside of the vehicle body 11, the inching control switch 51 and the stop switch 52 project from the mount surface 48 to the outside of the vehicle body 11 accordingly. Therefore, the towing tractor 10 having this configuration allows the operator to operate the inching control switch 51 and the stop switch 52 from outside of the vehicle body 11.

The forward inching control switch 53, the backward inching control switch 54, and the stop switch 52 are electrically connected to the control device 35 in the storage space 33. The control device 35 is operable to drive the driving motor 34 by operating the inching control switch 51 while the main power of the vehicle body 11 is turned on. When the forward inching control switch 53 is turned on, the control device 35 causes the driving motor 34 to move the towing tractor 10 forward in an inching manner, and when the backward inching control switch 54 is turned on, the control device 35 causes the driving motor 34 to move the towing tractor 10 rearward in an inching manner. The towing tractor 10 inches forward and rearward in response to the operation of the inching control switch 51. When the stop switch 52 is turned on, the control device 35 activates a brake device and the like of the towing tractor 10 to bring the towing tractor 10 to a stop.

The function of the towing tractor 10 according to the present embodiment will now be described.

In connecting an object T to be towed to the coupling device 12, the operator of the towing tractor 10 moves to a position near the inching control switch device 41, as shown in FIG. 4, to operate the inching control switch 51. In operating the inching control switch 51 and the stop switch 52 mounted in the switch casing 42, the operator needs to be present in front of, and normal to or parallel to the mount surface 48 of the mount plate 44 of the switch casing 42. Since the mount surface 48 is inclined at 45 degrees with respect to the vehicle width direction, the operator is guided to a position adjacent to and behind either one of the rear corners of the vehicle body 11 (the left rear corner in the present embodiment) where the operator is positioned facing normal to or parallel to the mount surface 48 and at an angle of 45 degrees with respect to the width or longitudinal direction of the vehicle body 11. In other words, the mount surface 48 is oriented such as to guide the operator to a position where the central angle of a circle having the operator at the vertex thereof that corresponds to the field of view of the operator is large enough for covering the rear end and the left end of the vehicle body 11 as shown in FIG. 4.

When the operator is positioned at a position adjacent to and behind the rear left corner of the vehicle body 11 and at 45 degrees with respect to the width or longitudinal direction of the vehicle body 11, as shown in FIG. 4, the operator will have a field of view indicated by A in the drawing. The field of view A of the operator positioned as described above is less occupied or blocked by the towing object T and the towing tractor 10, as compared with the case where the operator is positioned between the towing tractor 10 and the towing object T.

According to the above embodiment, therefore, the following effects are obtained.

(1) When connecting a towing object T to the coupling device 12 of the towing tractor 10, the operator is guided to a position adjacent to and behind either one of the rear corners of the vehicle body 11 on the side thereof where the inching control switch 51 and the stop switch 52 are located, in order to operate the inching control switch 51. The position allows the operator to visually check the area between the coupling device 12 of the towing tractor 10 and the towing object T and the coupling condition. Furthermore, as compared with a case when the operator is positioned between the vehicle body 11 and a towing object, a wider field of view of the operator is ensured and the instruments 26 on the dashboard 24 may also be visible to the operator.

(2) The switch casing 42 is provided so as to be recessed frontward. The inching control switch 51 and the stop switch 52 which are accommodated in the switch casing 42 are protected from external impact, such as an impact from a falling object. Therefore, the inching control switch 51 and the stop switch 52 are prevented from being operated unintentionally or damaged due to such external impact.

(3) The provision of the mount surface 48 which is inclined at 45 degrees with respect to the vehicle width direction helps to guide the operator to an appropriate position that is adjacent to and behind either one of the rear corners of the vehicle body 11 on the side thereof where the mount surface 48 and the inching control switch 51 are located.

(4) The inching control switch 51 which are mounted to the inclined mount surface 48 project with an inclination with respect to the vehicle width direction or the vehicle longitudinal direction accordingly. Therefore, the operator guided by the mount surface 48 to the position adjacent to and behind the rear corner of the vehicle body 11 can operate the inching control switch 51 and the stop switch 52 with ease.

It is to be noted that the above embodiment may be modified variously as shown below:

The disposition of the mount surface 48, or the inclination angle of the mount surface 48 with respect to the vehicle width direction or the vehicle longitudinal direction, may variously be changed as long as such disposition guides the operator to the position adjacent to and behind either one of the rear corners of the vehicle body 11 on the side thereof where the mount surface 48 is located.

The shape of the switch casing 42 may variously be modified as long as the switch casing 42 of such modified shape includes the mount surface 48. For example, the switch casing 42 may be a polygonal prism, such as a quadrangular prism. The shape of the mount surface 48 may optionally be changed to a polygon, an ellipse, or any other shape. The shape of the opening 38 through the panel 37 may also be changed according to the shape of the switch casing 42.

According to the above embodiment, the mount surface 48 is provided to the panel 37 in the rear of the vehicle body. However, the mount surface 48 may alternatively be provided to the rear frame 31 in the rear of the vehicle body.

The inching control switch device 41 may be located on the right of the center of the rear portion of the vehicle body in the vehicle width direction. In such case, the structure of the inching control switch device should be symmetrical to the inching control switch device 41 of the above embodiment with respect to an imaginary plane extending longitudinally along the longitudinal centerline of the vehicle body 11. To be more specific, when the inching control switch device is located on the left side from the center of the panel in the vehicle width direction or the left of the longitudinal imaginary plane, the mount surface is oriented to face obliquely leftward and rearward, while when the inching control switch device is located on the right of the center of the rear portion of the vehicle body in the vehicle width direction or the right of the longitudinal imaginary plane, the mount surface is oriented to face obliquely rightward and rearward.

The towing vehicle according to the present invention may be of any other types of towing tractor than the towing tractor 10 described with reference to the above embodiment, as long as the towing vehicle includes a coupling device such as 12 which is designed to connect a towing object to the towing vehicle.

According to the above embodiment, the inching control switch 51 is of a latching type. However, any other types of switches may be used for the inching control switch as long as the switch is operable to be turned on and off by an operator. The types of the inching control switch include, but not limited to, a lever type and a slide type.

What is claimed is:

1. A towing vehicle comprising:
a vehicle body;
a coupling device which is provided in a rear portion of the vehicle body and to which an object to be towed is connectable;
a panel which is provided in the rear portion of the vehicle body and extends in a vehicle width direction; and
an inching control switch which is provided to the panel, wherein
the panel has a recessed portion that is recessed frontward and is located at a position shifted from a center of the rear portion of the vehicle body in the vehicle width direction,
the recessed portion has a mount surface at a position adjacent to a rear corner thereof, the mount surface being provided such that
the mount surface is exposed to the outside of the vehicle body and the inching control switch projects from the mount surface to the outside of the vehicle body, and
the mount surface extends at an angle with respect to the vehicle width direction so that a part of the mount surface that is closest to the center of the rear portion of the vehicle body in the vehicle width direction is located rearward of the other part of the mount surface that is most distant from the center of the rear portion of the vehicle body in the vehicle width direction.

2. The towing vehicle according to claim 1, wherein the mount surface is inclined at 45 degrees with respect to the vehicle width direction.

3. The towing vehicle according to claim 1, wherein
the inching control switch includes a forward inching control switch and a backward inching control switch,
the towing vehicle further comprises a stop switch which is aligned with the forward inching control switch and the backward inching control switch in an alignment direction, and
the stop switch is disposed between the forward inching control switch and the backward inching control switch in the alignment direction.

4. The towing vehicle according to claim 3, wherein
the alignment direction of the forward inching control switch, the stop switch, and the backward inching control switch is parallel to a side of the part of the mount surface that is closest to the center of the rear portion of the vehicle body in the vehicle width direction.

* * * * *